United States Patent Office 3,310,818
Patented Mar. 28, 1967

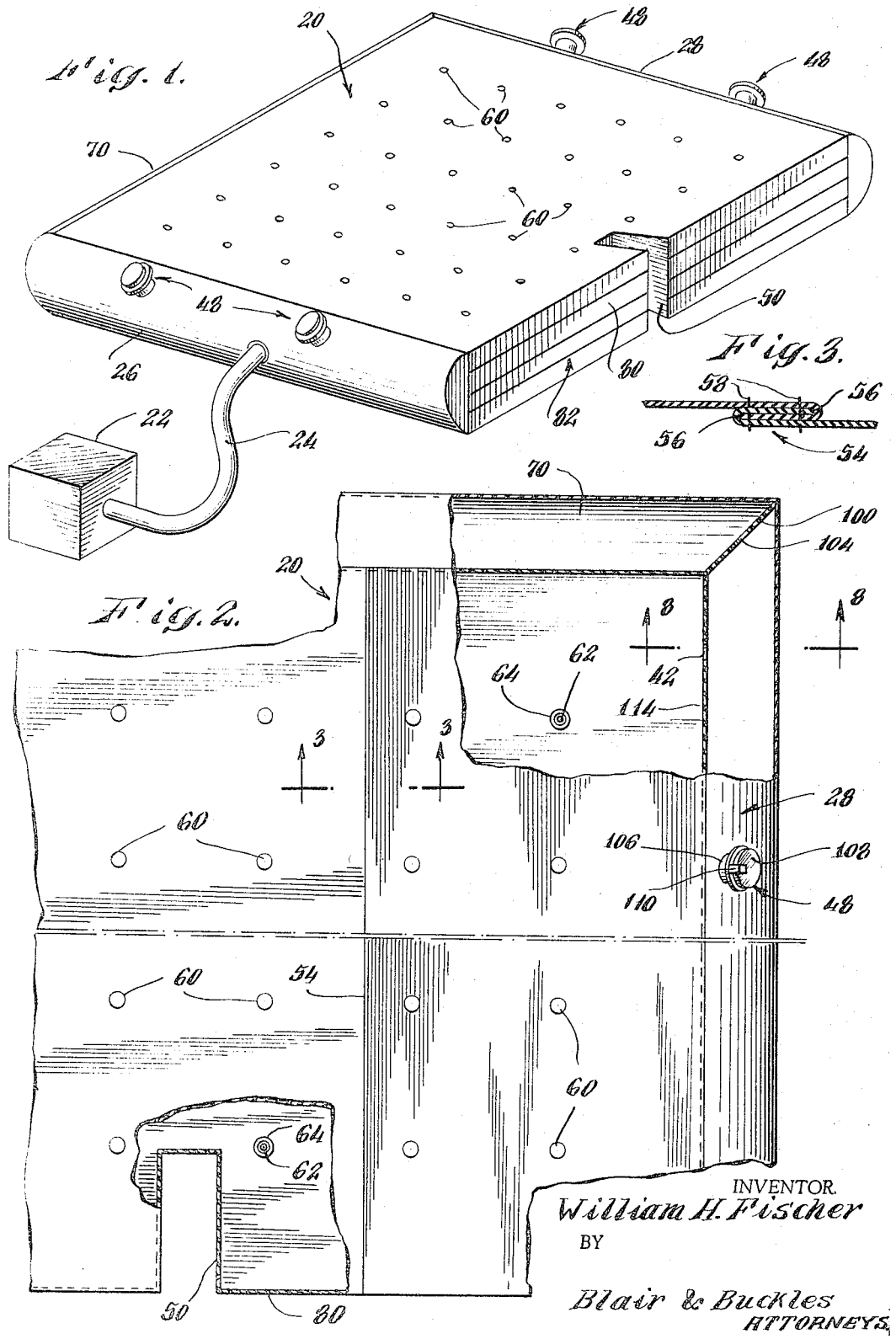

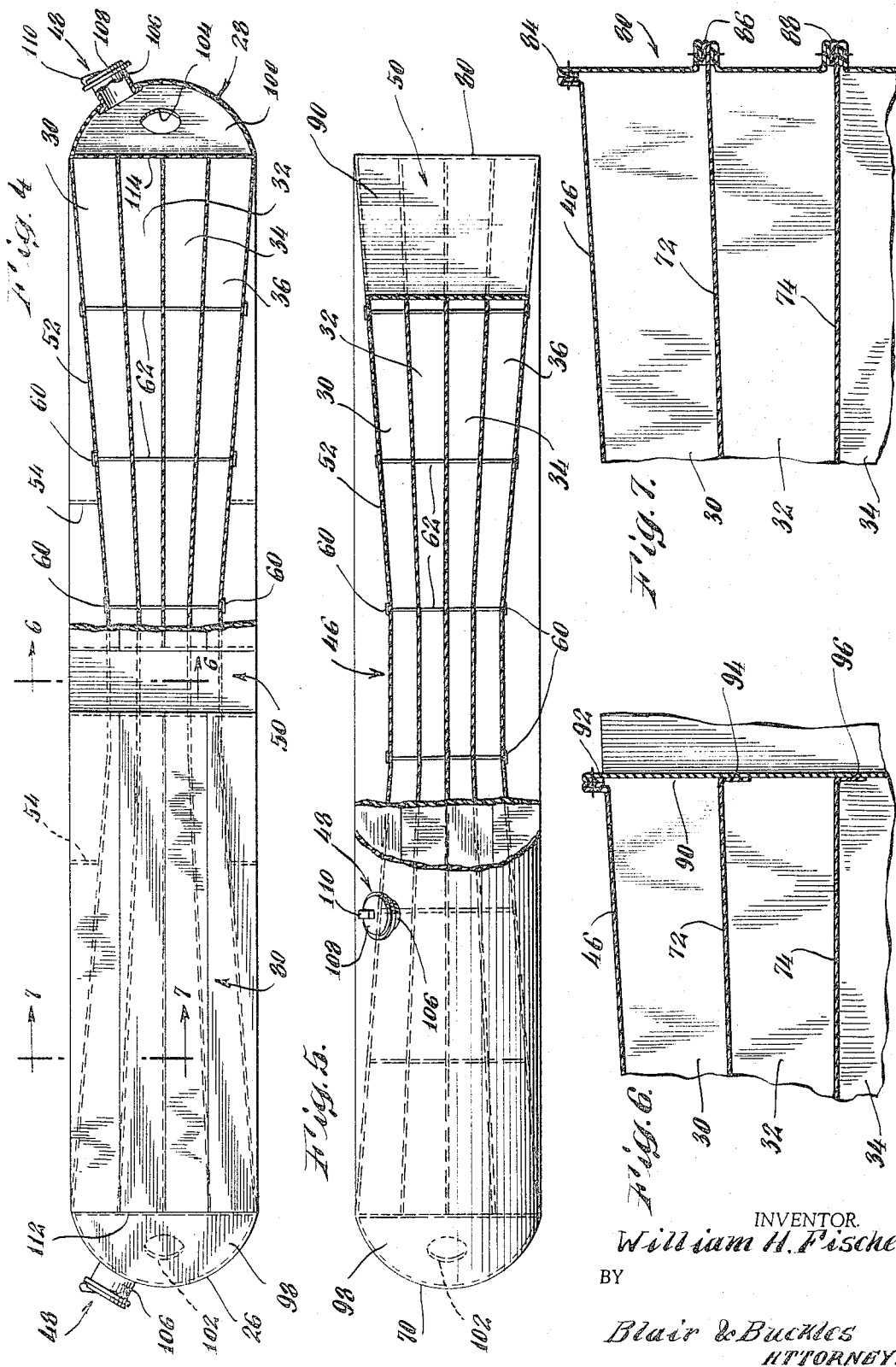

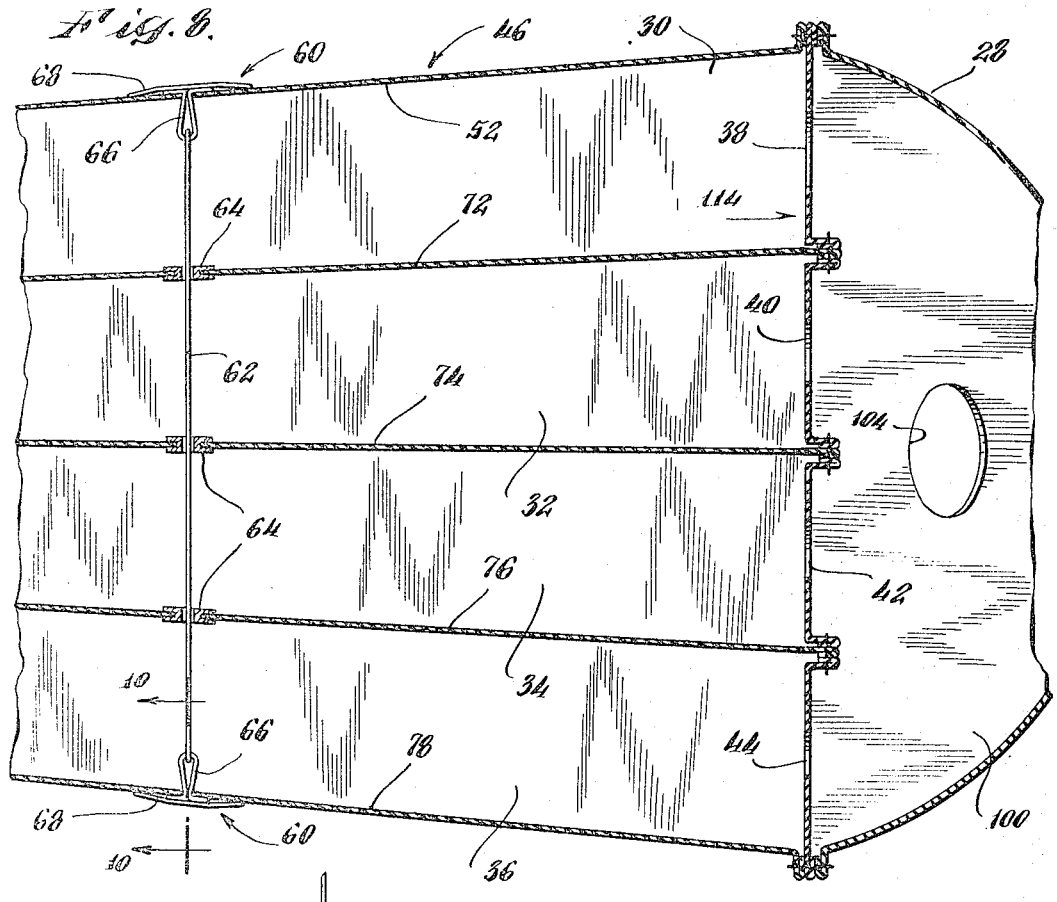

1

3,310,818
SHOCK ABSORBING APPARATUS
William H. Fischer, Sandy Hook, Conn., assignor to Air Inflatable Products Corporation, a corporation of Delaware
Filed Oct. 22, 1964, Ser. No. 405,664
8 Claims. (Cl. 5—348)

This invention relates to shock absorbing apparatus and more particularly to such a shock absorber comprising a multichamber inflatable mat.

The inflatable shock absorber of my invention can be used to cushion the shock of falling human bodies such as pole vaulters or persons being rescued from burning buildings. Similarly, my shock absorber may also be used to cushion the fall of fragile objects other than human bodies.

Prior art approaches in the field of pole vaulting pits for example, first comprised the use of sawdust to cushion the fall of the pole vaulter. In more recent years a pile of blocks of foamed plastic has been utilized as cushioning in pole vaulting pits. Although the foamed plastic blocks are an improvement over the use of sawdust, they still have several drawbacks. The blocks are bulky and accordingly are quite cumbersome to store. A further drawback is that the blocks may have to be repositioned in the pole vaulting pit from time to time since they may become displaced by the impact of the pole vaulter into them.

Prior art fire escape nets have generally comprised a heavy canvas net about ten feet in diameter which is secured by springs to a holding ring around its periphery. Such a net is used to catch persons who leap from burning buildings into the net, which is held by a number of fireman. To catch an adult in such a fire net, generally requires ten or more fireman to hold the net in position, since the impact of a falling body is substantial. Thus, an inordinate amount of fire fighting manpower is required to use such escape nets effectively. Further, the requirement that the firemen hold the net until the falling person is safely caught endangers the safety of the firemen themselves since firemen have been hit by falling persons in rescue attempts.

The invention may also be employed in other embodiments as a receiving mat for boxes or other objects which are dropped from a considerable height and which would otherwise be damaged unless received by such shock absorbing apparatus. Another application of the invention in readily modified form is as a cushion for the underside of objects which are parachuted to earth. In such an application the shock absorbing apparatus of my invention may be secured to the underside of the parachuted object and inflated before or during the parachute drop.

Prior art approaches to shock absorbers for the air dropping of objects such as crates have merely employed inflated mats or those of foam rubber and like cushioning materials. Such shock absorbers are quite resilient, however, and bouncing of the crate or carton may result in damage to the air dropped material.

Accordingly it is an object of the present invention to provide an inflatable shock absorbing apparatus.

Another object of the invention is to provide shock absorbing apparatus of the above character wherein a plurality of air chambers are used for shock cushioning.

A further object of the invention is to provide shock absorbing apparatus of the above character wherein each of the chambers performs a successively stiffer shock absorbing function.

2

Another object of the invention is to provide shock absorbing apparatus of the above character which may be used in a variety of applications.

A further object of the invention is to provide shock absorbing apparatus of the above character which is relatively inexpensive to manufacture and use.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a perspective view of my inflatable shock absorbing apparatus for use as a pole vaulting pit.

FIGURE 2 is an enlarged partial view of the apparatus of FIGURE 1, partially broken away to show construction features.

FIGURE 3 is a partial sectional view of a seam taken along line 3—3 of FIGURE 2 looking in the direction of the arrows.

FIGURE 4 is an enlarged end view in partial section of the apparatus shown in FIGURE 1.

FIGURE 5 is an enlarged side view in partial section of the apparatus shown in FIGURE 1.

FIGURE 6 is a partial sectional view taken along line 6—6 of FIGURE 4 looking in the direction of the arrows.

FIGURE 7 is a partial sectional view taken along line 7—7 of FIGURE 4 and looking in the direction of the arrows.

FIGURE 8 is an enlarged partial end sectional view and taken along line 8—8 of FIGURE 2 looking in the direction of the arrows.

FIGURE 9 is an enlarged partial top view in section of a corner of the apparatus shown in FIGURE 1.

FIGURE 10 is a partial sectional view taken along line 10—10 of FIGURE 8 and looking in the direction of the arrows.

FIGURE 11 is a perspective view of an embodiment of the invention for use as a rescue apparatus.

Referring now to FIGURES 1, 2 and 8, the invention will be described in general. The embodiment shown in FIGURES 1, 2 and 8 is particularly adaptable to use as a pole vaulting pit, i.e., as a shock absorber to cushion the fall of a pole vaulter after he clears the bar. As shown in FIGURE 1, the shock absorbing apparatus is in the form of an inflatable mat 20 which is inflated to a low pressure by a blower 22 via conduit 24. Conduit 24 is connected to a manifold 26 which is in fluid communication with all other chambers and manifolds making up the mat, as will be more fully explained hereinafter.

As best shown in FIGURES 4 and 8, the mat 20 is made up of a number of superimposed chambers 30, 32, 34 and 36 which are in fluid communication with manifold 28 and manifold 26 through air passages 38, 40, 42 and 44 respectively, each succeeding air passage from the top down being of diminished size. Thus, air is exhausted from each chamber into the manifolds 26 and 28 through the passages 38, 40, 42 and 44 at differing rates, with passage 38 offering the least resistance to air flow, and passage 44 offering the most resistance to air flow into the manifold. When a body or object lands on the top 46, the air expelled from the chambers 30, 32, 34 and 36 gives a shock absorber effect to cushion the fall of the body or object, with a stiffening of shock absorber effect as the air in each successive chamber is compressed by the body or object. As shown in FIGURES 1, 2 and 4, large outlet valves 48 are positioned on the upper portions of manifolds 26, 28 to release air forced into the manifolds from the chambers 30, 32, 34 and 36.

The invention will now be described more specifically. As shown in FIGURES 1 and 2, the inflatable shock absorbing mat 20 when used as a pole vaulting pit may be approximately 16 feet along each side and approximately from 30 to 50 inches in height when inflated. When used as a pole vaulting pit, a notched portion 50 may be provided for fitting around the pole stop which receives the supporting end of an implanted pole.

As shown in FIGURE 4, the fabric layers such as top layer 52 may be made of a plurality of pieces of material joined at seams 54. A preferred seam is shown in FIGURE 3 wherein the fabric edges 56 are interlocked one with another with stitching 58 holding them together. The interlocking seam provides added seam strength and reliability to the shock absorbing mat.

As shown in FIGURES 1, 4 and 5, a plurality of tie points 60 are secured together by tensor cords 62 to maintain the mat in proper shape upon inflation. As shown in FIGURE 8, cord eyelets 64 are positioned and aligned in each interior fabric layer. The tensor cords 62 pass through eyelets 64 and are secured to points 60 in the top and bottom layers by fittings 66 which are covered by patches 68 secured to the adjacent fabric layer by an adhesive.

The tensor cords 62 thus maintain the shape of the shock absorbing mat and as shown in FIGURES 4 and 5 are preferably shorter in the center of the mat to provide a slightly concave landing surface. With such a concave landing surface, a body falling on top of the mat tends to stay on the mat and is directed toward the mat center.

As shown in FIGURES 1 and 2, the chambered portion of the mat is provided with manifolds 26, 28 at opposite sides thereof and a third bumper manifold 70 along the mat front. It should be pointed out that although in the embodiment shown there is a manifold on three sides of the mat, the fourth side may be provided with a manifold as well. It has been found however, that for a pole vaulting pit, the embodiment shown is preferable.

As shown in FIGURES 4, 5 and 8, the chambers 30, 32, 34 and 36 are formed by rubberized fabric layers 52, 72, 74, 76 and 78 with the layers spaced approximately 9 inches apart adjacent the manifold sides. As best seen in FIGURE 7, a side wall 80 is formed along the side 82 (FIG. 1) by joining sidewall portions to fabric layers 52, 72, 74, 76 and 78 at seams such as 84, 86, 88, etc. As shown in FIGURES 5 and 6, the cutout portion 50 may be formed by forming a wall 90 around the dented portion with the substantially horizontal fabric layers 52, 72, 74, 76 and 78 secured thereto at points 92, 94, 96, etc.

As shown in FIGURES 2, 4, 8 and 9, the manifolds 26, 28 are separated from bumper manifold 70 by partitions 98, 100 having throttling ports 102, 104 respectively. These throttling ports may be 6 to 8 inches in diameter and are provided to permit the pressure in bumper 70 to slightly increase during impact of a body on the mat. Thus the bumper manifold 70 is fully inflated upon impact of a body on the mat, and with increased inflation rises slightly to help keep the falling body on the mat top surface 46.

In the manifolds 26, 28, as best seen in FIGURES 1 and 4, exhaust outlet ports 48 are positioned on the upper portion of the manifold wall and comprise a cylindrical extension 106 having a lid 108 hinged at 110. These exhaust outlet ports 48 permit the release of air upon the impact of a body landing on the mat. Preferably they are maintained in a closed position by gravity against the very low air pressure in the manifolds. I have found that two such ports in each manifold 26, 28 is sufficient to release air at the proper rate. A sudden increase in air pressure by the impact of a body on the mat causes them to be readily opened to spill air from the manifolds as the mat performs its shock absorbing function. The stiffness of the shock absorbing action may be varied by variation of the opening resistance of the lids 108.

As shown in FIGURE 8, air passages 38, 40, 42 and 44 are provided in the sidewalls 112, 114 with each air passage providing an air path connecting the side manifolds 26, 28 and the chambers 30, 32, 34 and 36 respectively. These air passages from the superimposed chambers are preferably located adjacent the mat corners in the sidewalls 112, 114 adjacent manifolds 26, 28 and the air passages are of diminishing diameter from the top of the mat on down. The successive change in air passage diameter from passage 38 to passage 44 increasingly impedes the air flow from each successive chamber.

Each of the chambers 30, 32, 34 and 36 thus provides more shock absorbing effect from the top down. As a falling body strikes the mat top 46 the air chamber 30 will thus be relatively easily exhausted through the passages 38 by the impact. There are preferably two passages connecting with manifold 26 and two passages connecting with manifold 28. The remainder of the passages 40, 42 and 44 also each have two passages opening into the manifolds 26, 28 respectively. The initial shock absorbing effect occurs as top panel 46 receives the impact of the falling body and compresses the air in chamber 30. As the air in chamber 30 is compressed, a substantial amount of the air is forced through air passages 38 into the manifolds 26, 28. The force of the falling body will then deform the top panel 46 downwardly and further compress the air in chamber 32 and successive chambers 34, 36. Air is thus expelled from chamber 32 through the four air passages 40, but since passages 40 have a smaller diameter than passages 38 the flow of compressed air from chamber 32 is impeded to provide a stiffer response to the falling object. Similarly, the compression of air in succeeding chambers 34 and 36 provides even stiffer resistance since the passages 42 and 44 are of even smaller diameter than the passages 40 in chamber 32.

I have found that for a pole vaulting pit the inflatable mat may be approximately 16 feet along each side with a maximum height of about 3 feet at the manifolds and a thickness of about 2 feet at center area on the mat. As shown in FIGURES 4 and 5, the concave center area of the mat is pulled together slightly by the tensor cords 62. As shown in FIGURE 8, the diameters of the air passages 38, 40, 42 and 44 are 3 inches, 2$\frac{9}{16}$ inches, 2$\frac{1}{8}$ inches and 1$\frac{1}{2}$ inches respectively. The diameters of the throttling ports 102, 104 (FIGURE 4) are 6 inches. The cylindrical extension 106 of the exhaust port assembly 48 has a diameter of 7 inches with a hinged lid 108 covering an exhaust outlet port having a diameter of 5 inches. As shown in FIGURE 4 the hinges for the exhaust outlet ports 110 are located at the top of the exhaust port lid 108. Thus the lids 108 are held closed by gravity to be opened by a slight increase in air pressure in the manifolds 26, 28. The exhaust port lids 108 may be adjustably weighted to vary the amount of resistance to opening and accordingly to vary the stiffness of shock absorber effect of the mat. The position and amount of weight on each lid 108, the area of the exhaust opening and the angle at which the lid is disposed in its closed position all affect the resistance to opening of the lids.

It has been found that air pressure of from 1 to 2 inches of water is ideal for cushioning the fall of human bodies and most similar shock absorbing functions. It should be understood, however, that specific shock absorbing functions may require air pressures outside the above range.

To inflate the apparatus the blower 22 is preferably a centrifugal blower powered by a fractional horsepower electric motor. The shock absorbing apparatus may also be inflated by manual pump or by gas releasing chemical reaction for those applications wherein it is impractical to provide an electrically powered blower.

I have found that the shock absorbing apparatus of my invention will cushion the fall of a human body in a very smooth and satisfactory manner. There is a minimum of "bounce-back" and in repeated tests the falling body did not "bottom out," i.e., did not have impact with the floor under the mat.

The embodiment shown in FIGURE 11 may be used as a rescue apparatus. The notched portion 50 (FIGURE 2) is eliminated and the shock absorbing mat 116 has four manifolds 118 along each side thereof, with an exhaust port assembly 48 in each of the manifolds to release air forced from the superimposed chambers of the center portion of the mat.

The construction and operation of the shock absorbing mat shown in FIGURE 11 is essentially the same as the pole vaulting pit shown in FIGURES 1–10, except that manifolds 118 may be used on all four sides. Strap handles 120 are also provided for positioning the shock absorbing mat to catch a falling body. Thus the mat may be readily inflated and positioned on the ground near a burning building to cushion the fall of people forced to leap to safety.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Pneumatic shock absorbing apparatus, comprising, in combination:
    A. means forming a plurality of superimposed chambers of flexible sheet material,
        (1) each of said chambers having means forming an open air passage in a wall thereof,
            (a) said passages decreasing in size for each successive chamber from the top down;
    B. a manifold of flexible sheet material in fluid communication with said chambers,
        (1) an air inlet on said manifold, and
        (2) an air valve outlet on said manifold,
            (a) said valve outlet being normally closed but opening on a slight increase in manifold air pressure; and
    C. means for inflating said manifold and said chambers through said air inlet and said air passages.

2. Pneumatic shock absorbing apparatus, comprising, in combination:
    A. means forming a plurality of separate, superimposed inflatable chambers,
        (1) each chamber having
            (a) an upper panel,
            (b) a lower panel, and
            (c) sidewalls,
        (2) each of said chambers having means forming an air passage through a sidewall thereof;
    B. an inflatable manifold in common fluid communication with the air passages of each chamber;
    C. an air valve outlet on said manifold,
        (1) said valve being normally closed but opening upon a slight increase in manifold air pressure; and
    D. means for inflating said chambers and said manifold.

3. Pneumatic shock absorbing apparatus as defined in claim 2 wherein said air passages in said chambers are successively diminished in size from the top down whereby the passage of air from each successive chamber is increasingly impeded to provide a stiffer response to a falling object as the air in each successive chamber is compressed by a falling object.

4. The combination defined in claim 2 wherein said chambers are provided with cord means for tying the uppermost panel and lowermost panel of said chambers together and passing through intermediate panels to maintain the position and shape of said chambers when they are inflated.

5. Pneumatic shock absorbing apparatus, comprising, in combination:
    A. means forming a plurality of separate, superimposed inflatable chambers,
        (1) each chamber having
            (a) an upper panel,
            (b) a lower panel, and
            (c) sidewalls,
        (2) each of said chambers having means forming an air passage through a sidewall thereof,
            (a) said air passages successively diminishing in size from the uppermost chamber on down;
    B. a plurality of inflatable manifolds,
        (1) enclosing the sidewalls of said chambers, and
        (2) in common fluid communication with the air passages of each chamber,
        (3) said manifolds being in fluid communication with each other manifold;
    C. air exhaust outlets on said manifolds,
        (1) said exhaust outlets comprising a valve being normally closed but opening upon a slight increase in manifold air pressure; and
    D. means for inflating said chambers and said manifolds.

6. The pneumatic shock absorbing apparatus defined in claim 5 wherein said exhaust outlets comprise means forming an outlet opening covered by a lid hinged at an upper edge, said exhaust outlets being positioned on an upper portion of said manifolds whereby said lid normally closes said outlet opening by gravity.

7. In an inflatable shock absorbing mat of flexible material, the combination of:
    A. a plurality of superimposed inflatable chambers;
    B. a plurality of manifolds around the sides of said chambers;
    C. means forming constricted air passages from each of said chambers to said manifolds, and
    D. normally closed exhaust valve outlet means on said manifolds whereby an object impacting on the top of said mat forces air from said superimposed chambers through said air passages into said manifolds and then through said exhaust valve outlet means to the atmosphere, the constriction of air flow through said air passages providing a shock absorbing effect for a falling object impacting on the top of said mat.

8. Shock absorbing apparatus for falling objects comprising in combination,
    A. a mat of flexible inflatable sheet material,
        (1) having means forming a plurality of superimposed chambers, B. means forming a constricted air outlet from each of said chambers, and
C. a manifold chamber of flexible material along the edge of said mat and enclosing said constricted air outlets from each of said chambers, and
D. exhaust outlet valve means on said manifold, said valve opening upon a slight increase in air pressure in said manifold.

References Cited by the Examiner
UNITED STATES PATENTS

| | | | |
|---|---|---|---|
| 2,245,909 | 6/1941 | Enfiajian | 5—348 |
| 2,906,366 | 9/1959 | Mapes | 182—139 |

FRANK B. SHERRY, *Primary Examiner.*

A. M. CALVERT, *Assistant Examiner.*